United States Patent [19]

Kaub et al.

[11] Patent Number: 5,647,213
[45] Date of Patent: Jul. 15, 1997

[54] MASTER CYLINDER WITH QUICKFILL STAGE

[75] Inventors: Manfred Kaub, Rhens; Hans-Christoph Lange, Mülheim-Kärlich; Peter Schlüter, Kammerforst, all of Germany

[73] Assignee: Lucas Industries public limited company, United Kingdom

[21] Appl. No.: 494,234

[22] Filed: Jun. 23, 1995

[30] Foreign Application Priority Data

Jul. 5, 1994 [DE] Germany .......................... 44 23 562.3

[51] Int. Cl.$^6$ ................................................ B60T 11/224
[52] U.S. Cl. ........................ 60/578; 60/589; 60/591
[58] Field of Search ........................... 60/574, 578, 589, 60/591

[56] References Cited

U.S. PATENT DOCUMENTS

| | | | |
|---|---|---|---|
| 2,031,360 | 2/1936 | Boughton | 60/578 |
| 2,197,681 | 4/1940 | Bowen | 60/578 |
| 2,458,803 | 1/1949 | Stelzer | 60/550 X |
| 2,508,403 | 5/1950 | Knauss | 60/578 X |
| 4,417,445 | 11/1983 | Furuta | 60/578 X |
| 4,702,077 | 10/1987 | Lilley et al. | 60/578 |
| 4,942,738 | 7/1990 | Kaub | 60/578 X |
| 5,079,914 | 1/1992 | Schluter | 60/578 |
| 5,359,854 | 11/1994 | Wagnet et al. | 60/589 X |

FOREIGN PATENT DOCUMENTS

| | | |
|---|---|---|
| 0308168B1 | 9/1988 | European Pat. Off. . |
| 3405392A1 | 10/1984 | Germany . |

*Primary Examiner*—F. Daniel Lopez
*Attorney, Agent, or Firm*—Wood, Herron & Evans, L.L.P.

[57] ABSTRACT

A master cylinder (10) for a hydraulic brake system comprises a quickfill stage (28) which in the initial phase of an actuation of the master cylinder rapidly fills an associated brake system with hydraulic fluid upon a relatively short actuation travel. A housing (12) of the master cylinder (10) extends essentially along an axis (A) and comprises at least one pressure chamber (14) formed therein which is open at the actuation end of the master cylinder (10). A quickfill piston and a quickfill chamber of the quickfill stage (28) are essentially formed by a cup shaped component (30) which is guided on the acutation end of the master cylinder housing (12) in a telescopical and pressure chamber sealing manner. This solution can be manufactured economically and requires little installation space.

12 Claims, 7 Drawing Sheets

MASTER CYLINDER WITH QUICKFILL STAGE

The invention relates to a master cylinder for a hydraulic braking system the master cylinder comprising a housing extending essentially along an axis and having at least one pressure chamber formed therein which is provided with an opening on the actuation side of the master cylinder, and a quickfill stage comprising a quickfill piston being guided coaxially with the axis and sealing the pressure chamber and a quickfill chamber, and which in the initial phase of an actuation of the master cylinder rapidly fills the braking system with hydraulic fluid upon a relatively short actuation travel.

Such a master cylinder is known from DE 34 05 392 A1. The master cylinder disclosed therein has the quickfill stage formed from a closure element arranged at the actuation side of the master cylinder, which essentially consists of a sleeve with an enlarged diameter relative to the bore of the master cylinder and a piston being telescopically guided within the sleeve. The sleeve which defines the main volume of the quickfill chamber is rigidly secured to the actuation end of the master cylinder housing.

Master cylinders with a quickfill stage are capable of overcoming the braking clearances, i.e. the lost motion which must be overcome upon actuation of a vehicle braking system before the brake pads are applied to the corresponding brake disk or drum, faster than master cylinders without quickfill stage, because the quickfill stage provides for the supply of a relatively great amount of hydraulic fluid into the braking system during the initial phase of the brake actuation. As soon as the hydraulic fluid in the pressure chamber has reached a certain pressure, the quickfill stage is deactivated. Upon any further actuation of the braking system, e.g. upon an additional brake pedal operation, there will be almost no displacement of the brake fluid within the braking system, but the actuation pressure is hydraulically converted to brake pressure in a known manner.

For controlling the quickfill stage of a master cylinder it is conventionally required to have at least one pressure dependently controlled, relatively sophisticated valve in the master cylinder. Moreover, conventional master cylinders with quickfill stages involve an expensive manufacturing process and, in addition, have relatively large dimensions.

In connection with the ongoing efforts to provide vehicles consuming less fuel, it is now required to increase the braking clearances to such an extent that the brake pads do no longer slide at their associated brake disks or drums. In this way, undesired drive resistances can be eliminated. So far it has been standard practice to guide the brake pads, in particular in the case of disk brakes, very close to the disk. A thereby occurring minor sliding contact between brake pads and brake disk was even desired because it advantageously provided for a rapid response of the vehicle disk brakes also when driving in rainy weather. An increase of the braking clearances, i.e. of the distance between brake pads and brake disk or brake drum, means that master cylinders with quickfill stages have to be employed more often, and also in small cars and middle-class cars.

The invention is therefore based on the object to provide a master cylinder with a quickfill stage for a hydraulic braking system, which occupies less installation space, can be manufactured at lower cost, and where the connection and disconnection of the quickfill stage can be solved by simpler constructional measures.

According to the invention this object is solved by forming the quickfill piston and the quickfill chamber essentially as a cup shaped component which is guided coaxially with the axis of the master cylinder housing on its actuation end in a telescopic and pressure chamber sealing manner. The sealing of the pressure chamber can be effected on the outside of the master cylinder, i.e. between the cup shaped component and the housing outer wall, but also between the pressure chamber inner wall and the cup shaped component.

According to the invention it is therefore possible to essentially adopt the master cylinder housing of a conventional master cylinder without quickfill stage. In particular, it is not necessary to design the master cylinder housing in stages. The cup shaped component as provided according to the invention does not only considerably reduce the manufacturing expenditures, it also ensures that a master cylinder according to the invention can be kept more compact.

Preferably the cup shaped component is mechanically connected with a pressure piston of the master cylinder, in particular with a first pressure piston which is also referred to as input piston. Alternatively, it is also possible to provide a pure fluid connection via the hydraulic fluid contained in the master cylinder between the cup shaped component and said pressure piston instead of a mechanical connection.

In an embodiment of the master cylinder according to the invention, the operation of the quickfill stage is controlled as a function of the actuation travel. This measure allows the omission of the sophisticated pressure dependent quickfill stage control system which has previously been standard practice. Preferably, the actuation travel dependent control of the quickfill stage is effected by a control cam extending in a circumferential direction in the pressure chamber of the master cylinder, which during an actuation of the master cylinder, cooperates with a control seal which is also arranged in the pressure chamber and extends in a circumferential direction in such a manner that the quickfill stage will be deactivated upon reaching a predetermined activation travel. The control seal can additionally be so designed that it looses its sealing capacity upon reaching a predetermined quickfill stage pressure. In this manner, it is ensured by simple means that during an operation of the quickfill stage the pressure generated by it does not exceed a predetermined value.

The control seal is preferably arranged on the pressure piston, i.e. the inlet piston. The control cam will then be arranged at the inner wall of the pressure chamber formed within the master cylinder housing and can also be designed integrally with the pressure chamber wall. Alternatively, it is also possible to provide the control seal in the inner wall of the pressure chamber and to form the control cam on the first pressure piston.

The cup shaped component can rigidly be connected with the first pressure piston in the direction of actuation. The cup shaped component and the first pressure piston will then be actuated together, e.g. by an upstream brake booster.

In another embodiment of the master cylinder according to the invention the cup shaped component is displaced in the direction of pressure buildup during an actuation of the master cylinder by a resilient element. The resilient element, in particular, is a coil shaped actuating spring. In the direction of pressure buildup, the resilient element is rigidly coupled with the first pressure piston so that it will be compressed upon the actuation of the first pressure piston and thus the master cylinder, thereby also displacing the cup shaped component in the direction of pressure buildup. The resilient element also provides for a pressure limitation of the quickfill stage, because upon exceeding a predetermined pressure which can be adjusted via the spring force of the resilient element, the quickfill stage will automatically be deactivated owing to the fact that the spring force of the element is no longer sufficient to further displace the cup shaped element in the direction of pressure buildup.

In order to avoid that the connection and disconnection of the quickfill stage is perceptible for the user of the braking system, e.g. during an actuation of the braking system, in the brake pedal of an automotive vehicle, other embodiments of the master cylinder according to the invention provide for disengaging of the cup shaped component from the first pressure piston of the master cylinder during its displacement in the direction of pressure buildup. This means that the displacement of the first pressure piston in the direction of pressure buildup is independent of the displacement of the cup shaped element in the direction of pressure buildup, and that a halt in the displacement of the cup shaped component in the direction of pressure buildup has no reaction on the first pressure piston and an element actuating it. With such embodiments the mechanical connection that remains between the first pressure piston and the cup shaped component e.g. only means that said two parts are guided concentrically one within the other.

Preferably, the resilient element is arranged radially outside the cup shaped component and surrounded by a cage against which one end of the resilient element bears. Therefore, a reaction onto an element actuating the master cylinder does not occur. Preferably, the cage surrounding the resilient element at the actuation end of the master cylinder extends so far radially inward that is does not only provide for a support of the resilient element but also provides a stop for the cup shaped component, in order to limit its axial displacement upon the return travel, in particular during a pressure filling of the braking system with hydraulic fluid.

The cage surrounding the resilient element can axially be secured on the acutation end of the master cylinder housing, e.g. by caulking the cage in a circumferential groove formed in the outside of the master cylinder housing.

According to another embodiment the cage is formed by the outer wall of a brake booster. For this solution, no separate cage is required.

According to still another embodiment the cage is not axially secured on the master cylinder housing but only slided over the actuation end of the master cylinder housing. With this embodiment, the end of the cage opposite its actuation end comprises a flange shaped end section which bears axially against the housing of the master cylinder, e.g. against the connecting flange of a two-piece master cylinder housing.

In the embodiments of the master cylinder according to the invention where a resilient element limits the pressure generated by the quickfill stage in a predeterminable way, the control seal can also be so designed that it will loose its sealing capacity when a predetermined vacuum is reached in the quickfill stage. Thus hydraulic fluid can flow into the quickfill chamber during the return travel of the cup shaped component without the necessity to provide a separate valve.

In still another embodiment of a master cylinder according to the invention, the axial displacement of the cup shaped component controls a plate valve in the course of the actuation of said master cylinder. At an axial displacement of the cup shaped component in the direction of pressure buildup, this plate valve closes a connection between the quickfill chamber and a reservoir for hydraulic fluid.

In many embodiments of the master cylinder according to the invention the first pressure piston being mechanically connected with the cup shaped component sealingly penetrates the cup shaped component and, moreover, is arranged axially movable relative to it.

For the sake of an easier manufacture and assembly, the housing of the master cylinder is preferably designed as being transversely split, e.g. in two pieces. Complicated-to-machine undercuts can thus essentially be avoided.

Several embodiments of a master cylinder with quickfill stage according to the invention will be explained in the following with reference to the schematic drawings, in which.

Figure 1:
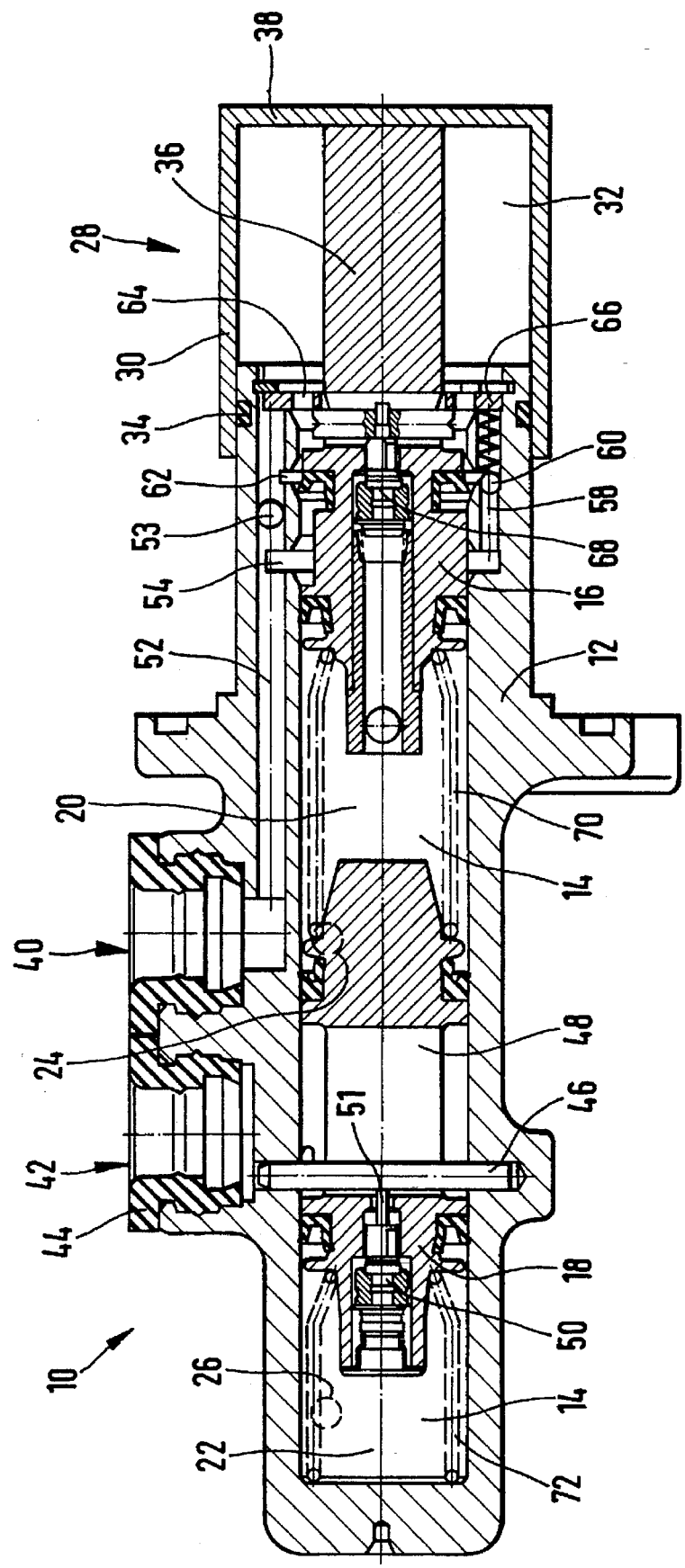
FIG. 1 shows a longitudinal section through a first embodiment of the master cylinder with quickfill stage according to the invention, where a cup shaped component is rigidly connected with a first pressure piston.

With reference to FIG. 1, the principle construction and the operation of a first embodiment of a master master cylinder generally identified by reference numeral 10 will now be described. The other embodiments will then be explained only with reference to any differences with respect to the first embodiment.

The master cylinder 10 shown in FIG. 1 comprises a housing 12 which extends essentially along an axis A, in which a pressure chamber 14 is formed extending in an axial direction and being open at the right hand side end of the housing 12 in FIG. 1 which in the following will be referred to as the actuation end. In the pressure chamber 14 a first pressure piston 16, also referred to as inlet piston, and a second pressure piston 18 are arranged to be axially movable and sealed against the inner wall of the pressure chamber 14 by means of several conventional—and therefore not described in detail—lip seals. The two pressure pistons 16 and 18 divide the pressure chamber 14 into two partial chambers 20 and 22. The first partial chamber 20 is formed between the first pressure piston 16 and the second pressure piston 18 and is provided with an outlet 24, through which a first brake circuit of a vehicle braking system is supplied with pressure fluid for brake actuation. The second partial chamber 22 is formed between the second pressure piston 18 and the left hand side end of the pressure chamber 14 in FIG. 1. It is provided with an outlet 26 which communicates with a second brake circuit of the vehicle braking system. The master cylinder 10 can thus be connected with a conventional dual-circuit braking system.

At the actuation end of the master cylinder 10 there is a quickfill stage, generally identified by reference numeral 28. The quickfill stage 28 comprises a cup shaped component 30 which surrounds a quickfill chamber 32 and is guided externally on the actuation end of the master cylinder housing 12 so as to be axially movable. Upon an axial displacement of the cup shaped component 30 it moves, as can be seen from FIG. 1, telescopically on the actuation end of the master cylinder housing 12. A radial sealing ring, in this case an O-ring seal 34, is arranged in an annular groove (not shown) on the outside of the housing 12 of the master cylinder and seals the quickfill chamber 32. A rod shaped extension 36 of the first pressure piston 16 having a smaller diameter than the first pressure piston 16 projects from the open end of the pressure chamber 14 and is rigidly coupled with a bottom 38 of the cup shaped component 30 in the direction of actuation. In the illustrated example the rod shaped extension 36 is integrally formed with the first pressure piston 16.

With the master cylinder 10 being in the condition ready for operation, both the partial chambers 20 and 22 as well as the quickfill chamber 32 are completely filled with hydraulic fluid. The hydraulic fluid reaches the pressure chamber 14 and from there the quickfill chamber 32 from a reservoir or compensating tank (not shown) via two openings 40 and 42, into which two corresponding connecting tubes of the reservoir (not shown) engage sealingly by means of an elastic sealing element 44.

To be more specific, the hydraulic fluid first enters a longitudinally slotted sleeve 46 via the opening 42. The sleeve 46, the ends of which are secured in the wall of the housing 12, extends both transversely across the pressure chamber 14 as well as through the second pressure piston 18, which for this purpose is provided with an elongated recess 48, so that its axial movability is ensured. From this space defined by the elongated recess 48 and the corresponding parts of the pressure chamber wall, the hydraulic fluid, via a central valve 50 which is arranged in the second pressure piston 18 and resiliently biased in the closed position, can then reach the partial chamber 22, from which the second brake circuit is supplied through the outlet 26.

From the opening 40, however, the hydraulic fluid first reaches a connecting hole 52 extending parallel to the axis A, the actuation end of which is closed by means of a press fitted sealing ball 53, from where it flows through an annular duct 54 being recessed into the wall of the pressure chamber 14 and providing the connection between the connecting hole 52 and the pressure chamber 14, and reaches an annular space 56 (see in particular FIG. 2) which is formed around the first pressure piston 16 between two lip seals arranged thereon at an axial distance to each other. The right hand lip seal (FIGS. 1 and 2) is a control seal, the function of which will be explained later. Via another annular duct 62 recessed into the wall of the pressure chamber 14 another but shorter axially parallel connecting hole 58 with a check valve 60 arranged therein and resiliently biased in its closed position, on the one hand, provides a connection through openings 64 in a stop disk 66 with the quickfill chamber 32 and, on the other hand, a connection with the partial chamber 20 via a second central valve 68 being also resiliently biased in its closed position.

The operation of the master cylinder 10 and its quickfill stage 28 will be explained in the following.

Figure 2:
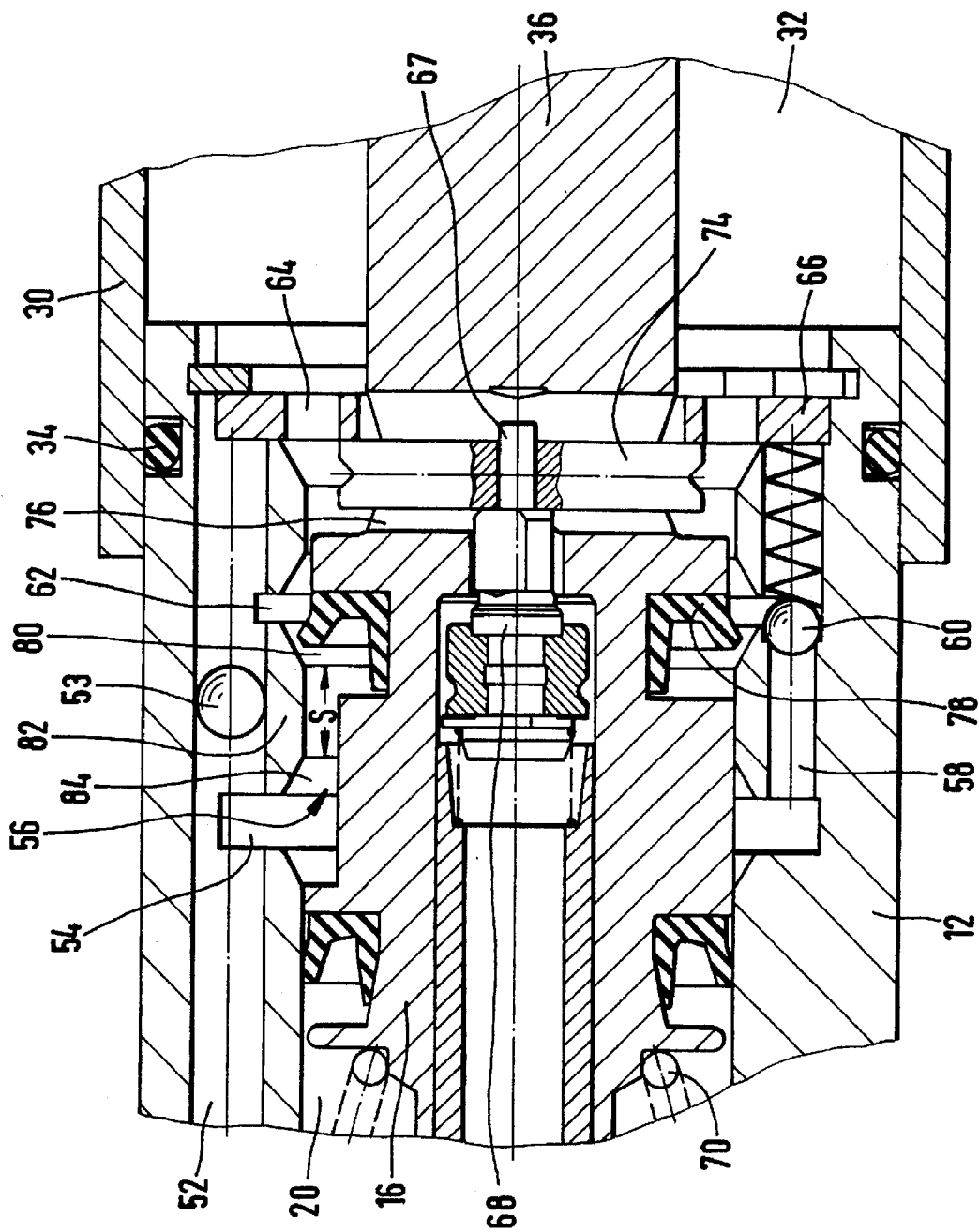
FIG. 2 shows the joining of the quickfill stage in FIG. 1 with the master cylinder housing in an enlarged illustration.

FIG. 1 and 2 show the master cylinder 10 in an unactuated, i.e. unloaded initial position. The two pressure pistons 16 and 18 are forced into their right hand end position, when referring to the Figures, by means of one return spring each, 70 and 72, respectively. In this initial position, the central valve 68 in the first pressure piston 16 is maintained open by means of a stop pin 74, which is arranged in a recess 76 of the first pressure piston 16 and connected with the valve body of the central valve 68 via a pin shaped extension 67 of the same, because the stop pin 74 abuts the stop disk 76 in this initial position. In this initial position, the central valve 50 in the second pressure piston 18 is also maintained open, because a pin shaped extension 51 connected with the valve body of the central valve 50 abuts the longitudinally slotted sleeve 46. The slot width of the sleeve 46 is so selected that the extension 51 of the valve body cannot penetrate the slot. The partial chambers 20 and 22 thus have a direct fluid connection in the initial position via the opened central valves 50 and 68 with the hydraulic fluid reservoir (not shown) which is arranged above the openings 40, 42.

In the initial position, a control seal 78 arranged on the first pressure piston 16 is so positioned that its sealing edge is approximately at the same height with another annular duct 62, so that in this initial position the annular space 56 comprises another connection with the quickfill chamber 32 which extends around the control seal 78 and past the stop pin 74 through the openings 64.

Now, the master cylinder is to be actuated. For this purpose, a brake booster (not shown in the figures) is generally arranged at the right hand side of the quickfill stage 28, which amplifies the operating force applied for example to a brake pedal, which is also not shown, and transfers it to the bottom 38 of the cup shaped component 30, whereby the quickfill stage 28 and thus the entire master cylinder 10 are activated.

The operating force which is transferred form the brake booster (not shown) to the bottom 38 of the cup shaped component 30 displaces the cup shaped component 30 and the first pressure piston 16 being rigidly connected with it in the direction of pressure buildup, i.e. to the left in FIG. 1. This causes the central valve 68 in the first pressure piston 16 to close without a considerable pressure being built up in the partial chamber 20. At the beginning of the actuation process hydraulic fluid from the quickfill chamber 32 can still flow past the control seal 78 and through the annular duct 54 and the connecting hole 52 and the opening 40 and back into the reservoir. After a certain lost motion, however, the sealing edge of the control seal 78 comes into contact with a first control edge 80 of an annular control cam 82 restricting the free sectional area of the pressure chamber 14 and being arranged in the area of the annular duct 56, which results in an interruption of the connection from the quickfill chamber 32 to the reservoir or compensating tank, respectively, for the hydraulic fluid.

In the course of further displacement of the cup shaped component 30 as well as the first pressure piston 16 coupled therewith the hydraulic fluid from the quickfill chamber 32 is then forced through the central valve 68 in the first pressure piston 16, which again opens due to the pressure increase in the quickfill chamber 32, into the partial chamber 20, where a rapid pressure increase takes place, so that the second pressure piston 18 which up to this point has been displaced in the direction of pressure buildup only by a small amount, the central valve 50 of which closes at the beginning of the actuation process, can also build up braking pressure. The relatively large fluid volume which is forced from the quickfill chamber 32 into the partial chamber 20 leads to rapidly overcoming the existing braking clearances.

After moving through an actuation distance S defined by the control cam 82, the sealing edge of the control seal 78 passes over a second control edge 84 which widens the free sectional area of the pressure chamber 14, whereby the connection between the reservoir for the hydraulic fluid and the quickfill chamber 32 is opened again, which causes the pressure in the quickfill chamber 32 to rapidly drop to the pressure level in the reservoir. Thereby, quickfill stage 28 is deactivated. A further displacement of the first pressure piston 16 to the left then increases the braking pressure in both partial chambers 20 and 22 in the usual way, i.e. without assistance from the quickfill chamber 28. It may happen that the pressure generated by the quickfill stage 28 already becomes too high, before the control seal 78 passes over the second control edge 84 of the control cam 82. The control seal 78 is therefore so formed and designed that its seal lip folds at a predetermined pressure which is not to be exceeded, whereby the control seal 78 looses its sealing capacity and hydraulic fluid from the quickfill chamber 32 can flow past the control seal 78 into the reservoir, until the pressure in the quickfill chamber 32 has dropped again below the predetermined maximum value.

With the termination of the actuation process by removing the operating force, the first and second pressure pistons 16 and 18 return into the above described initial position due to the built up pressure in the partial chambers 20 and 22 as well as due to the forces exerted by the return springs 70 and 72. Thereby the quickfill chamber 32 again increases its volume and takes in hydraulic fluid from the reservoir for the hydraulic fluid via the opening 40, the connection hole 52, the annular duct 54, the annular duct 56 and past the control seal 78 through the openings 64 in the stop disk 66. This, however, is only possible until the control seal 78 passes the second control edge 84 of the control cam 82 during its return travel, because after that the connection between the quickfill chamber 32 and the reservoir for the hydraulic fluid is temporarily interrupted. In order to avoid the generation of a vacuum in the quickfill chamber 32, the check valve 60 is provided. As soon as a vacuum begins to build up in the quickfill chamber 32, said check valve 60 resiliently biased in the closed position opens, again providing a connection between the reservoir and the quickfill chamber 32 via the further connecting hole 58 and the annular duct 54 so that additional hydraulic fluid can be drawn into the quickfill chamber 32. After the sealing edge of the control seal 78 has passed the first control edge 80 of the control cam 82 in the course of the return travel of the first pressure piston 16 into the initial position, hydraulic fluid can again be drawn directly via the annular space 56 and past the control seal 78 into the quickfill chamber 32.

Figure 3:
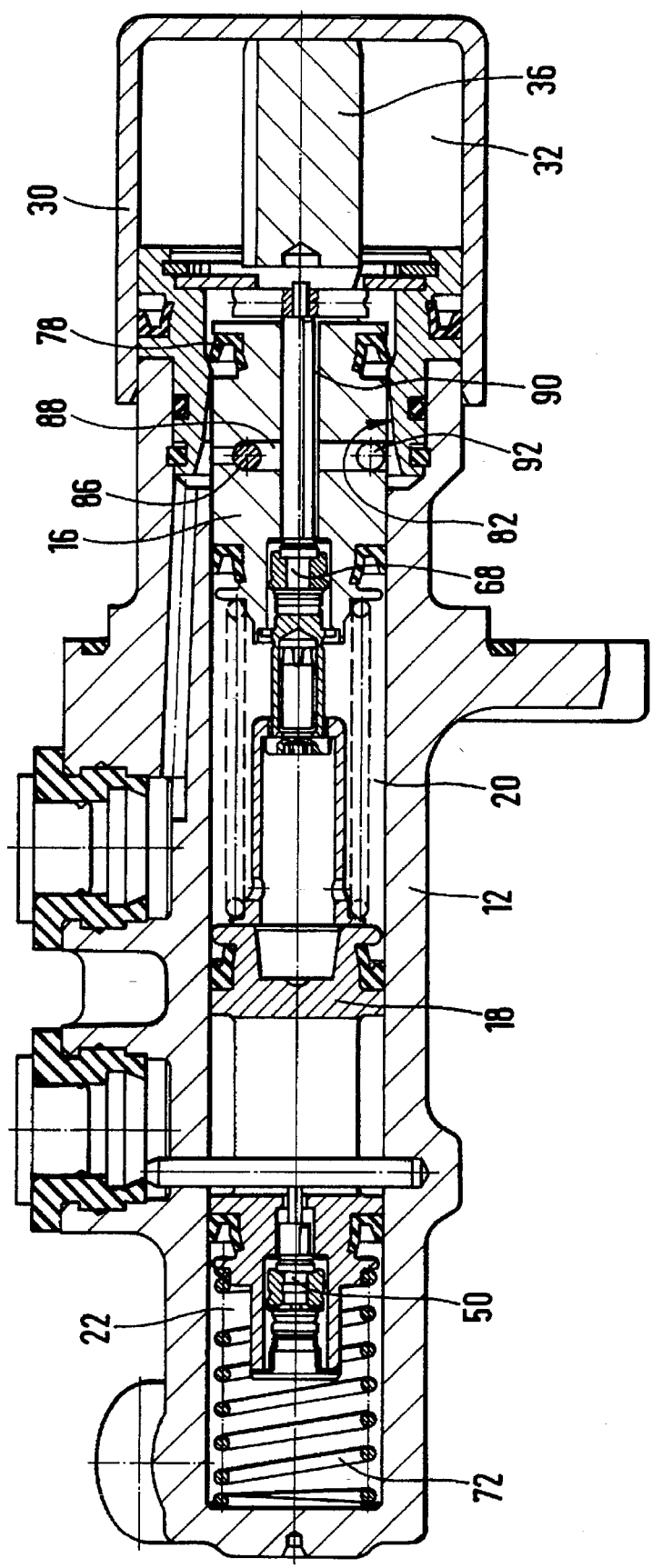
FIG. 3 shows a longitudinal section through a second embodiment, which is slightly modified compared to the first embodiment.

FIG. 3 shows a second embodiment which is similar to the above described first embodiment. The essential difference compared to the first embodiment is a modified geometry of the control cam 82. While the first control edge 80 has approximately the same geometry as in the first embodiment, the second control edge 84, contrary to the first embodiment, follows the first control edge 80 essentially directly, however, in a first section effects only a slowly increasing sectional area at first, with a more rapidly increasing sectional area in a second section. In this manner a smooth pressure decrease and thus a smooth transition to the subsequent operation without the quickfill stage 28 is already achieved soon after the activation of the quickfill stage 28.

In the second embodiment, instead of the check valve 60 a floating, i.e. not a resiliently biased, check valve 86 is arranged in a transverse hole 88 of the first pressure piston 16, which, during the return travel of the pressure piston 16 and the cup shaped component 30, enables a connection between the reservoir for the hydraulic fluid and the quickfill chamber 32 via an axial hole 90 being also arranged in the first pressure piston 16 and intersecting the transverse hole 88. The transverse hole 88 is closed by means of a press fitted sealing ball 92 so that the floating check valve 86 is opened only if a vacuum with respect to the pressure level in the reservoir occurs due to the increasing volume in the quickfill chamber 32 associated with the return stroke. Otherwise, the operation of the second embodiment does not differ from that of the first embodiment.

Figure 4:
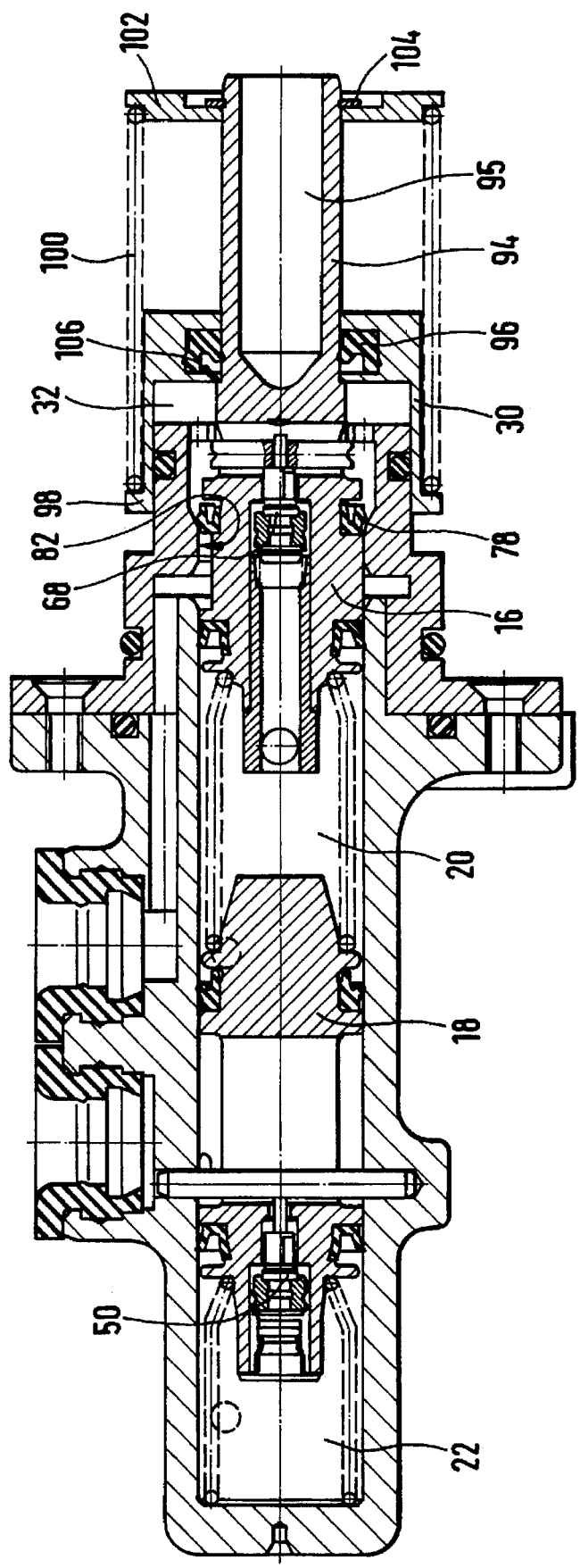
FIG. 4 shows a longitudinal section through a third embodiment, where the cup shaped element is actuated by a resilient element.
Figure 5:
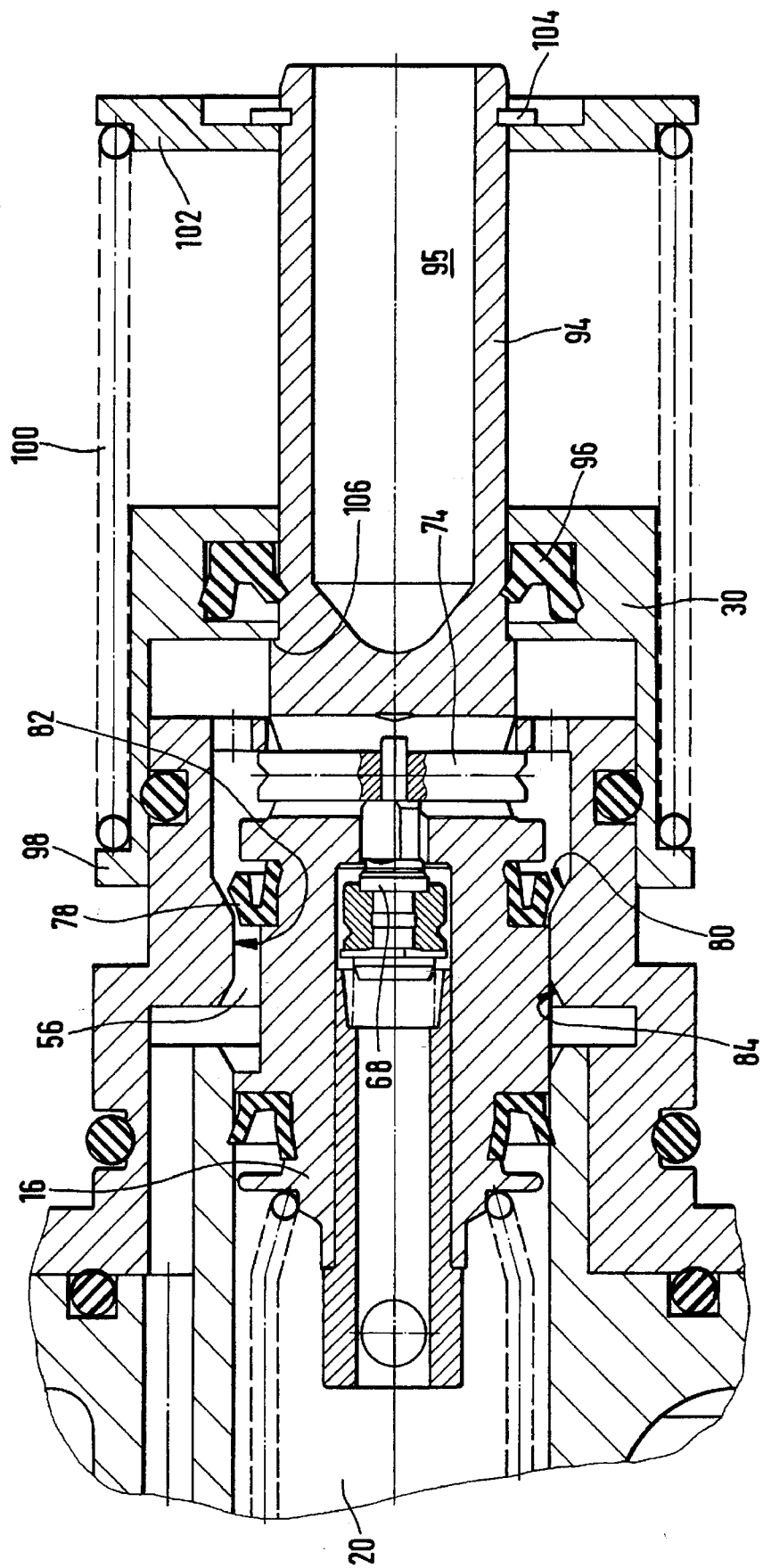
FIG. 5 shows the joining of the quickfill stage in FIG. 4 with the master cylinder housing in an enlarged illustration.

FIGS. 4 and 5 show a third embodiment of the master cylinder 10 which differs primarily from the previously described embodiments by the way in which the quickfill stage 28 is activated.

In this third embodiment, the cup shaped component 30 is not rigidly connected with the first pressure piston 16. In this case, a rod shaped extension 94 which is integrally formed with the first pressure piston 16 projects from the pressure chamber 14 and penetrates the now annularly formed cup shaped component 30. A lip seal 96 is arranged in a circumferential groove in the bottom 38 of the cup shaped component 30 sealing it against the rod shaped extension 94 in an axially movable manner. At the end of the cup shaped component 30 facing the master cylinder 10, a collar 98 is arranged projecting outwardly and rectangularly to the axis A which supports one end of a coil shaped actuating spring 100 which is arranged radially outside the cup shaped component 30. The other end of the coil shaped actuating spring 100 is supported by a ring 102 arranged on the rod shaped extension 94, with the ring being secured against an axial displacement to the right (FIG. 4) by means of a locking ring 104.

An actuation of the master cylinder 10 according to the embodiment is effected by introducing an actuation force into the rod shaped extension 94, e.g. via an actuation rod (not shown) which engages a recess 95 in the rod shaped extension 94. This means that in this embodiment the quickfill stage 28 is only indirectly activated via the actuating spring 100. This results in the advantage of a filling pressure limitation proportional to the spring force so that travel dependent tolerances can no longer influence the filling pressure generated by the quickfill stage 28. Upon reaching a filling pressure which is predetermined by the choice of the actuating spring 100 and which exceeds the spring force, the cup shaped component 30 comes to a halt and only the first pressure piston 16 and the second pressure piston 18 will be further displaced in the direction of pressure buildup.

The filling pressure limitation proportional to the spring force of the third embodiment allows to install the control seal 78 in a reversed manner as compared to the first two embodiments so that the seal lip of the control 78 does no longer loose its sealing capacity upon an overpressure in the quickfill chamber 32 but upon a vacuum occurring therein, and hydraulic fluid can flow past the control seal 78 into the quickfill chamber 32. The check valve 60 or the check valve 86, respectively, of the first or the second embodiment, respectively, can therefore be omitted.

A projection 106 formed at the first pressure piston 16 provides for the cup shaped components 30 to be also returned into the initial position by means of a positive engagement during the return travel of the first pressure piston 16.

Contrary to the first two embodiments, the housing 12 of the master cylinder 10 according to the third embodiment is designed as a two-piece housing. This makes it possible to essentially adopt the left hand part of the housing 12 (FIG. 4) of an conventional master cylinder so that only the right hand portion of the housing 12 (FIG. 4) has to be designed differently. The two-piece configuration of the housing 12 additionally offers advantages with respect to manufacturing aspects and allows simple assembly.

FIG. 6 through 9 show embodiments where, contrary to the previously described embodiments, the quickfill stage 28 is completely disengaged from an actuating element, e.g. a brake pedal (not shown) of a vehicle. The actuation force required to active the quickfill stage 28 therefore no longer causes a perceptible reaction in the brake pedal.

Figure 6:
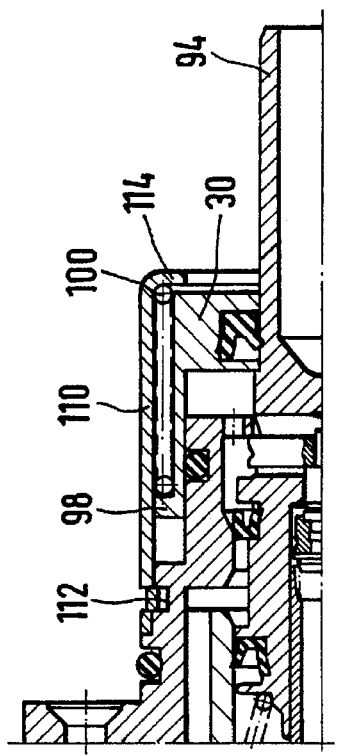
FIG. 6 shows a longitudinal section in the area of the quickfill stage of a fourth embodiment, which is slightly modified compared to the third embodiment, where the actuation of the cup shaped component is disengaged from the actuation of the first pressure piston.

In the fourth embodiment according to FIG. 6 this is achieved in that the actuating spring 100 bears directly against a control housing 108 of the brake booster (not shown). The actuation force required for the quickfill stage 28 will thus entirely be provided by the brake booster and is not perceptible at the brake pedal.

Figure 7:
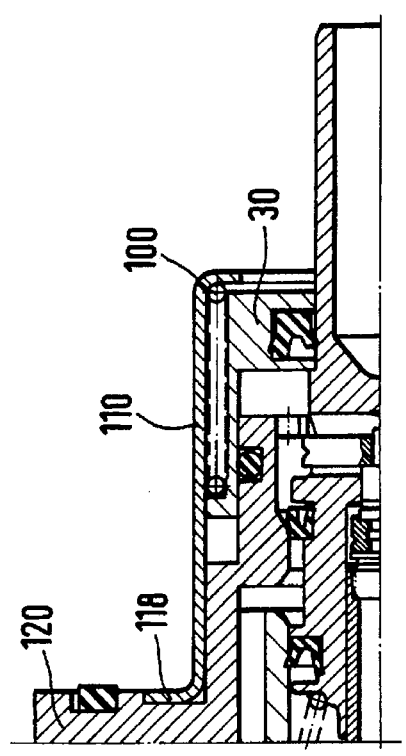
FIG. 7 shows a longitudinal section similar to that of FIG. 6 of a further modified fifth embodiment, where a cage surrounds the resilient element.

In a fifth embodiment according to FIG. 7 the actuating spring 100 is surrounded by a spring cage 110 against which bears one end of the actuating spring 100. The spring cage 110 is axially secured to the actuation end of the housing 12 of the master cylinder 10 by means of caulking in a circumferential groove. An annular bottom 114 of the spring cage 110 extends so far radially inside that it does not only support the actuating spring 100, but additionally also limits the axial displacement of the cup shaped component 30 to the right, i.e. in the opposite direction of pressure buildup. This is necessary, above all, when a braking system, which uses the master cylinder 10 is filled under pressure after the assembly or in the course of maintenance work. In the case of a filling under pressure the braking system is first evacuated and then the entire system is filled with pressurized hydraulic fluid. This can cause the cup shaped component 30 to be displaced so far to the right that an axial stop becomes necessary.

Figure 8:
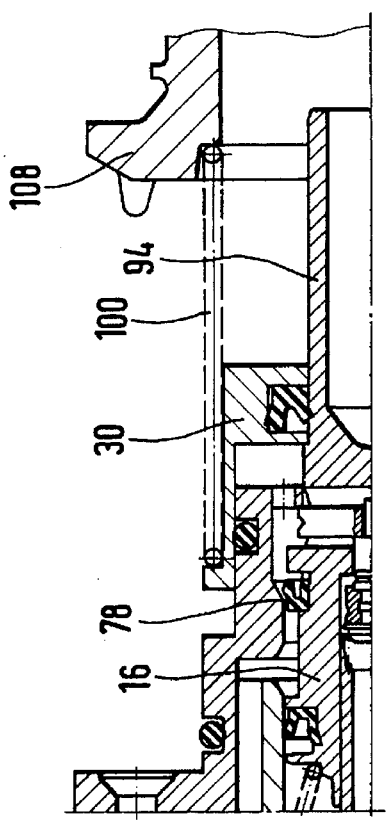
FIG. 8 shows a longitudinal section similar to that of FIG. 7 of a sixth embodiment, where the cage is formed by the outer wall of a brake booster.

Contrary to the fifth embodiment, the sixth embodiment according to FIG. 8 does not provide a separate spring cage 110 surrounding the actuating spring 100. The spring cage function is instead provided by an outer wall 116 of the brake booster (not shown).

Figure 9:
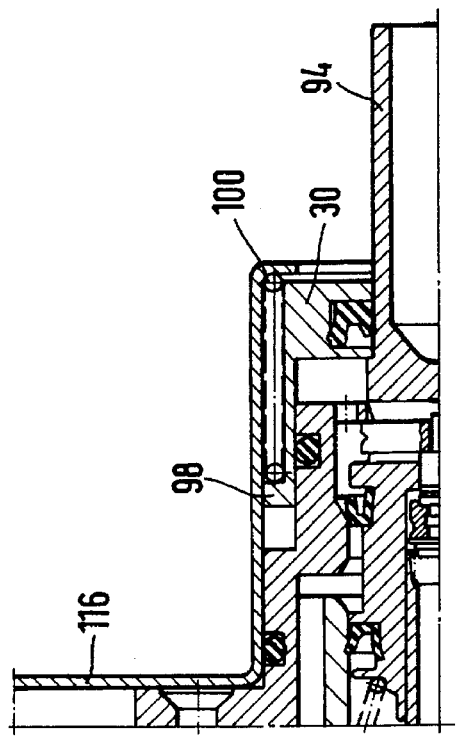
FIG. 9 shows a longitudinal section similar to that of FIG. 7 of a seventh embodiment, where the cage is not axially secured on the master cylinder housing.

In a seventh embodiment according to FIG. 9 the spring cage 110 surrounding the actuating spring 100 is so designed that it comprises a flange shaped end section 118 which extends parallel to a flange 120 of the housing 12 of the master cylinder 10. During the assembly of the master cylinder 10 the so designed spring cage 110 is slided onto the actuation end of the master cylinder housing 12 and then forced against the outer wall of an associated brake booster, at which the master cylinder 10 is to be attached. After the assembly of the master cylinder to the brake booster the spring cage 110 of the seventh embodiment is thus secured in an axially rigid manner.

The operation of the fourth through seventh embodiment is similar to that if the third embodiment, i.e. the master cylinder 10 of the fourth through seventh embodiment is also provided with a filling pressure limitation proportional to the spring force of the quickfill stage 28.

Figure 10:
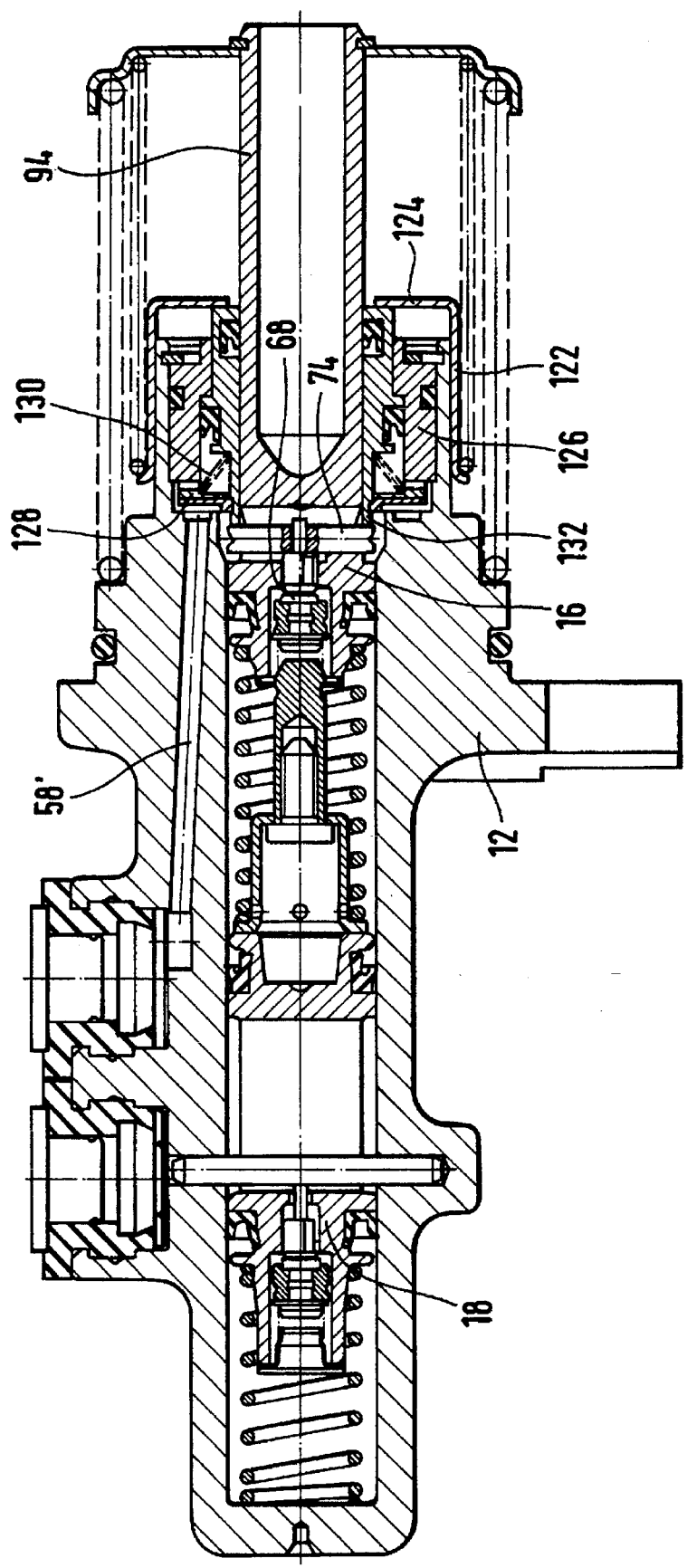
FIG. 10 shows a longitudinal section through an eighth embodiment, where the axial displacement of the cup shaped component during an actuation controls a plate valve.

FIG. 10 shows an eighth embodiment of the master cylinder 10. Here, the cup shaped component 30 being also spring actuated similar to the third through seventh embodiment is designed as a multipart component, contrary to the previously mentioned embodiments. It consists of an actuating cage 122 being guided on the actuation end of the master cylinder housing 12, a radially inwardly extending bottom 124 of which can displace an annular quickfill piston 126 in the direction of pressure buildup, which is guided axially displacable and sealingly about the rod shaped extension 94. At the pressure end of the quickfill piston 126 a plate valve 128 is arranged which bears against the filler piston 126 via a spring 130 and which closes the connecting hole 58' to the hydraulic fluid reservoir upon an acutation of the master cylinder 10 after a defined lost motion. With this embodiment, too, the pressure limitation proportional to the spring force of the quickfill stage 28 comes into effect: Upon reaching a predetermined pressure which exceeds the actuating spring force, the quickfill piston 126 does no longer move in the direction of pressure buildup.

At the pressure side of the quickfill piston 126 there is additionally provided an annular extension 132 which by means of a contact with the stop pin 74 is capable of maintaining the central valve 68 in the first pressure piston 16 in an open position, until a predetermined pressure is reached.

We claim:

1. A master cylinder (10) for a hydraulic braking system comprising:

a housing (12) extending essentially along an axis (A) and including at least one pressure chamber (14) formed therein which is provided with an opening on an actuation side of the master cylinder (10), a quickfill stage (28) comprising a quickfill piston being guided coaxially with the axis and sealing the pressure chamber (14) and a quickfill chamber, and which in the initial phase of an actuation of the master cylinder (10) rapidly fills the brake system with hydraulic fluid upon a relatively short actuation travel, a cup shaped component (30) telescopically and sealingly guided on the actuation end of the master cylinder housing (12), the cup shaped component forming the quickfill piston and the quickfill chamber (32), and further being mechanically connected with a pressure piston (16) of the master cylinder (10), whereby operation of the quickfill stage (28) is controlled as a function of the actuation travel, sealing of the quickfill chamber being accomplished via an O-ring seal in contact with both an inner surface of the cup shaped component and an outer surface of the master cylinder housing.

2. A master brake cylinder according to claim 1, characterized in that the cup shaped component (30) is disengaged from the pressure piston (16) with which it is mechanically connected during the displacement in the direction of pressure buildup.

3. A master brake cylinder according to claim 1, characterized in that the housing (12) of the master cylinder (10) is split in the transverse direction.

4. A brake master cylinder (10) for a hydraulic braking system comprising:

a housing (12) extending essentially along an axis (A) and including at least one pressure chamber (14) formed therein which is provided with an opening on an actuation side of the master cylinder (10), a quickfill stage (28) comprising a quickfill piston being guided coaxially with the axis and sealing the pressure chamber (14) and a quickfill chamber, and which in the initial phase of an actuation of the master cylinder (10) rapidly fills the brake system with hydraulic fluid upon a relatively short actuation travel, a cup shaped component (30) telescopically guided on the actuation end of the master cylinder housing (12), the cup shaped component forming the quickfill piston and the quickfill chamber (32), a control cam (82) extending in a circumferential direction and arranged in the pressure chamber (14) which during an actuation of the master brake cylinder (10) cooperates in such a manner with a control seal (78) which is also arranged in the pressure chamber (14) and extends in a circumferential direction that the quickfill stage (28) will be deactivated upon reaching a predetermined actuation travel.

5. A master brake cylinder according to claim 4, wherein the control seal (78) is so designed that it looses its sealing capacity upon reaching a predetermined quickfill stage pressure.

6. A master brake cylinder according to claim 4 wherein the control seal (78) is arranged on the pressure piston (16).

7. A master brake cylinder according to claim 4, wherein the cup shaped component (30) is displaced in the direction of pressure buildup during an actuation of the master cylinder (10) by a resilient element, in particular, an actuating spring (100).

8. A master brake cylinder (10) for a hydraulic braking system comprising:
   a housing (12) extending essentially along an axis (A) and including at least one pressure chamber (14) formed therein which is provided with an opening on an actuation side of the master cylinder (10),
   a quickfill stage (28) comprising a quickfill piston being guided coaxially with the axis and sealing the pressure chamber (14) and a quickfill chamber, and which in the initial phase of an actuation of the master cylinder (10) rapidly fills the brake system with hydraulic fluid upon a relatively short actuation travel, and
   a cup shaped component (30) telescopically guided on the actuation end of the master cylinder housing (12), the cup shaped component forming the quickfill piston and the quickfill chamber (32),
   the axial displacement of the cup shaped component (30) controlling a plate valve (128) which at an axial displacement of the cup shaped component (30) in the direction of pressure buildup, interrupts a connection between the quickfill chamber (32) and a reservoir for hydraulic fluid.

9. A master brake cylinder (10) for a hydraulic braking system comprising:
   a housing (12) extending essentially along an axis (A) and including at least one pressure chamber (14) formed therein which is provided with an opening on an actuation side of the master cylinder (10),
   a quickfill stage (28) comprising a quickfill piston being guided coaxially with the axis and sealing the pressure chamber (14) and a quickfill chamber, and which in the initial phase of an actuation of the master cylinder (10) rapidly fills the brake system with hydraulic fluid upon a relatively short actuation travel,
   the quickfill piston and the quickfill chamber (32) being formed by a cup-shaped component (30) which is telescopingly guided on the actuation end of the master cylinder housing (12),
   the cup shaped component (30) being disengaged from the pressure piston (16) with which it is mechanically connected during the displacement in the direction of pressure buildup, the cup-shaped component (30) being displaced in the direction of pressure buildup during an actuation of the master cylinder (10) by a resilient element arranged radially outside the cup shaped component (30) and surrounded by a cage (110) against which one end of the resilient element bears in the axial direction.

10. A master brake cylinder according to claim 9, wherein, the cage (110) is axially secured on the acutation end of the master cylinder housing (12).

11. A master brake cylinder according to claim 9, wherein the cage is formed by an outer wall (116) of a brake booster housing.

12. A master brake cylinder according to claim 9, wherein, the cage (110) comprises at its end opposite its actuation end a flange shaped end section (118) which bears axially against the housing (12) of the master cylinder (10).

* * * * *